United States Patent [19]
Miyauchi et al.

[11] 3,869,920
[45] Mar. 11, 1975

[54] SYMMETRICALLY ARRANGED, DEFLECTION TYPE DIFFERENTIAL PRESSURE TRANSMITTERS FOR CONTROLLING INDUSTRIAL SYSTEMS AND PROCESSES

[75] Inventors: Rin-Ichi Miyauchi; Bunjiro Saito; Kyoichi Ikeda, all of Tokyo, Japan

[73] Assignee: Yokogawa Electric Works, Ltd., Tokyo, Japan

[22] Filed: Apr. 13, 1973

[21] Appl. No.: 350,930

[52] U.S. Cl. ............................. 73/398 R, 73/407 R
[51] Int. Cl. ........................... G01l 9/10, G01l 7/08
[58] Field of Search ........ 73/398 R, 407 R, 388 BN; 336/30

[56] References Cited
UNITED STATES PATENTS

| | | | |
|---|---|---|---|
| 3,718,047 | 2/1973 | Nakagawa | 73/398 R |
| 3,720,108 | 3/1973 | Freitag | 73/398 R |

*Primary Examiner*—Donald O. Woodiel
*Attorney, Agent, or Firm*—Bryan, Parmelee, Johnson & Bollinger

[57] ABSTRACT

Differential pressure transmitters used to measure fluid flow rate or liquid level in industrial processes for the purpose of controlling such processes. The transmitters include a pressure-responsive unit in the form of a twin-diaphragm capsule having two diaphragms disposed generally parallel to and spaced from each other, a spring mechanism in the shape of a stepped rod mounted between and linked to the two diaphragms at their centers, and a displacement-to-electric signal transducer for converting the displacement of the spring mechanism into an electric signal. The spring mechanism and the transducer are enclosed in a hermetically sealed chamber filled with an oil bath. The diaphragm, the spring mechanism, and the transducer are symmetrically arranged with respect to a reference plane and are mounted in a main housing. A pressure differential causes the diaphragm centers and the spring mechanism to be displaced until the reaction force equals that generated by the differential pressure. The displacement of the spring mechanism is converted into an electric output signal by the transducer.

15 Claims, 9 Drawing Figures

FIG. 5
FIG. 6
FIG. 7
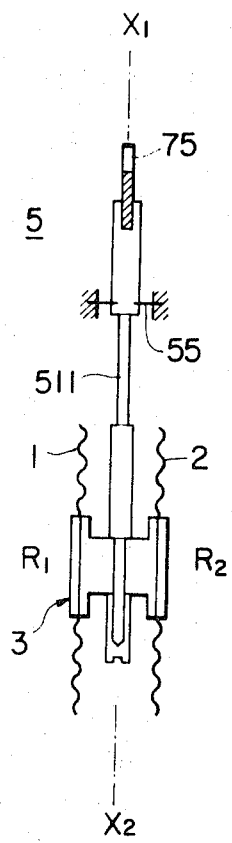
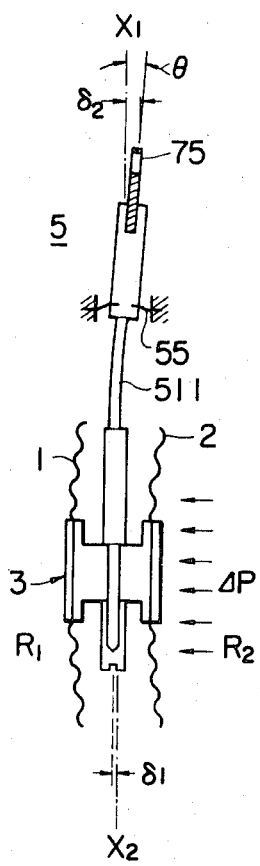
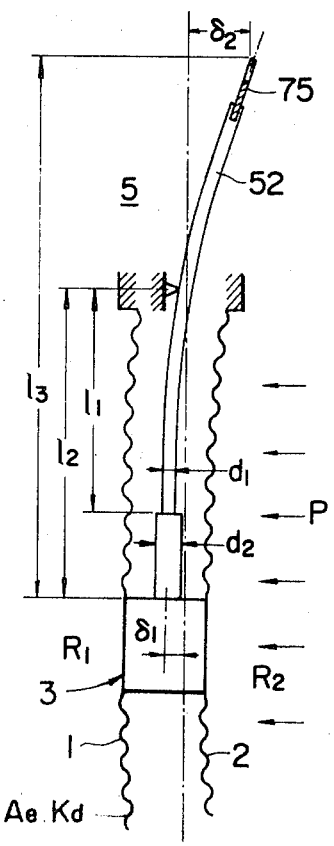

SYMMETRICALLY ARRANGED, DEFLECTION TYPE DIFFERENTIAL PRESSURE TRANSMITTERS FOR CONTROLLING INDUSTRIAL SYSTEMS AND PROCESSES

BACKGROUND OF THE INVENTION

1. Field of the Invention

Fluid flow rate, in industrial processes, may be determined by measuring the pressure differential developed by a flow restrictive device, such as an orifice, installed in the fluid-carrying pipe-line. Liquid level in a fluid system may also be determined by measuring the difference between atmospheric pressure and the pressure at the bottom of a liquid-containing tank. Thus, one may control either fluid flow rate or the quantity or the level of liquid in an industrial process by controlling the differential pressure associated with that flow rate or liquid level.

The present invention relates to differential pressure transmitters which convert differential pressure into an electrical signal for transmission to an external output instrument.

2. Description of the Prior Art

Force-balance type differential pressure transmitters are known in the prior art. These transmitters typically include a diaphragm assembly connected by means of a force-bar to a nozzle-flapper mechanism which controls a feedback bellows coupled to the force-bar. A pressure differential to be measured is conducted to the diaphragm assembly. The resulting force produced by that pressure is transmitted through the force-bar to the nozzle-flapper mechanism. The nozzle back-pressure is amplified and transmitted to the feedback bellows. The force developed at the bellows is directly related to the force generated by the pressure differential on the diaphragm assembly.

The force-bar in conventional force-balance type transmitters is positioned on one side of the diaphragm assembly. Additionally, the pressure responsive unit of such transmitters, where the pressure differential is generated, is not constructed symmetrically with respect to the path along which the measured force is transmitted from the diaphragms. In such a construction, the weight of the elements comprising the path through which measured forces are conducted, may affect the actual total force measured by the device depending upon the angle at which the device is installed. In other words, such a device is sensitive to attitude or orientation. Furthermore, the accuracy of an asymmetrically constructed differential pressure transmitter is affected by thermal expansion of its components due to temperature variation.

In some force-balance type differential pressure transmitters, a portion of the force-bar, linked to the diaphragm assembly, is located in a pressure-receiving chamber within the pressure responsive unit and, therefore, is exposed to fluid in the system which is being monitored. The force-bar is supported by a flexible element, called a sealing diaphragm, which serves both as a fulcrum for the force-bar and as a seal for the pressure receiving chamber. One end of the force-bar is exposed to the atmosphere. In this structure, the fluid in the observed system may leak from the pressure receiving chamber through the sealing diaphragm. The sealing diaphragm is also subject to deformation by the pressure of the fluid in the pressure-receiving chamber. The strain thus caused in the sealing diaphragm leads to static pressure error and consequent error in the output of the transmitter. If the sealing diaphragm is provided with a means for relieving the deforming pressure against it, the differential pressure which is observed cannot accurately be measured.

Deflection-type differential-pressure transmitters are also presently known. Unlike the force-balance type, the force developed at the pressure-receiving element as a result of a pressure differential detected in a deflection type transmitter is directly balanced with the reaction force of a spring mechanism until equilibrium is reached. The resulting displacement of the spring mechanism, which is calibrated in terms of the differential pressure detected, is measured. This type of differential-pressure transmitter eliminates the need for a feedback mechanism such as the feedback bellows utilized in the force-balance type transmitter. Therefore, the construction of the instrument can be simplified. Further, since the magnitude of the displacement output in the deflection type transmitter is dependent upon the elastic deformation developed in the spring mechanism, this displacement is relatively large and can be adjusted, for example, by changing the position of the fulcrum of the spring mechanism or by modifying the shape of the spring mechanism. These characteristics make it possible to construct a differential pressure transmitter that may be packaged in a relatively small housing.

The pressure differential ranging from 0 to 50 mm and from 0 to 100 mm of water column is generally referred to as "ultra-low" differential pressure. Some differential pressure transmitters, which measure such small differential pressures, use nitrile rubber diaphragms in order to increase their sensitivity. Rubber diaphragms, however, tend to corrode and wear as a result of the corrosive action of the fluid which contacts them. Consequently, they require replacement after a period of use.

SUMMARY OF THE INVENTION

The present invention is directed to a deflection type differential pressure transmitter of small size and simple construction. A preferred embodiment to be described includes a pressure-responsive unit in the form of a twin diaphragm capsule having two diaphragms generally parallel to and spaced from each other, and a spring mechanism in the shape of a stepped rod mounted between and linked to the two diaphragms at their centers. An independent pressure receiving chamber is positioned on each side of the twin diaphragm capsule. A pressure differential, created between the two receiving chambers, causes the diaphragm centers, and hence, the stepped rod to be displaced until the force generated by the differential pressure equals the reaction force developed by the two diaphragms and the rod. The resulting elastic deformation in the stepped rod is directly related to rod displacement. This displacement is converted into an electrical output signal by a displacement-to-electric signal transducer.

In such a deflection type of differential-pressure transmitter, the need for the feedback mechanismm is eliminated. Therefore, the size of the instrument may be reduced and its construction may be simplified.

Furthermore, the spring mechanism is only in the form of a stepped rod with a portion having a reduced diameter. The elasticity of this portion determines the reaction force against which force generated by a differential pressure is measured. This characteristic also simplifies the construction of the instrument.

The present invention further relates to a deflection type differential pressure transmitter which minimizes the measurable output error due to thermal expansion of components of the instrument due to temperature change. The instrument may be used to measure ultra-low differential pressures, for example, in an allowable ambient temperature range from −20° to +80°C, or a total ambient temperature range of 100°C. As temperature changes in this range, the components of a typical transmitter expand or contract, which in turn affects the displacement output signal. Thus output error results. The transmitter of the present invention, however, minimizes this error by utilizing a pressure-responsive unit the components of which are arranged symmetrically. The axis of symmetry is coincident with the axis of the spring mechanism which longitudinally extends through the twin-diaphragm capsule and the displacement-to-electric signal transducer. This axis is perpendicular to the direction of force generated by measured differential pressure. Therefore, the expansion or contraction of the elements occurs symmetrically in a direction unrelated to that of application of the measured force, and the expansion or contraction effects are thus canceled. This symmetrical construction also minimizes the attitude sensitivity of the device thereby minimizing output error due to the orientation or attitude in which the device is installed.

The present invention also relates to a deflection-type differential-pressure transmitter which minimizes static pressure error. In the present invention, a twin diaphragm capsule having a pair of identical diaphragms forms the pressure receiving element. Static pressure is applied to the twin diaphragm capsule perpendicularly to the axis of the diaphragms. The diaphragms completely seal the pressure-receiving chambers. No sealing diaphragm, acting as a force-bar fulcrum, is exposed to observed fluid pressure. Therefore, static pressure error arising from sealing diaphragm deformation is eliminated.

The deflection-type differential-pressure transmitter of the present invention utilizes stainless steel diaphragms that are highly resistant to corrosion and wear which results from the corrosive characteristics of the observed fluid.

Other objects, aspects and advantages of the invention will be pointed out in, or apparent from the following detailed description considered together with the accompanying drawings.

DESCRIPTION OF THE DRAWINGS

FIG. 5 is a schematic diagram of this embodiment of the invention showing the pressure responsive unit in its rest position;

FIG. 6 is a schematic diagram of the smae embodiment of the invention showing the pressure-responsive unit when displaced under the influence of a pressure differential;

FIG. 7 is a schematic diagram of the same embodiment of the invention showing parameters which illustrate the operation of the transmitter;

DESCRIPTION OF THE PREFERRED EMBODIMENTS

Figure 1:
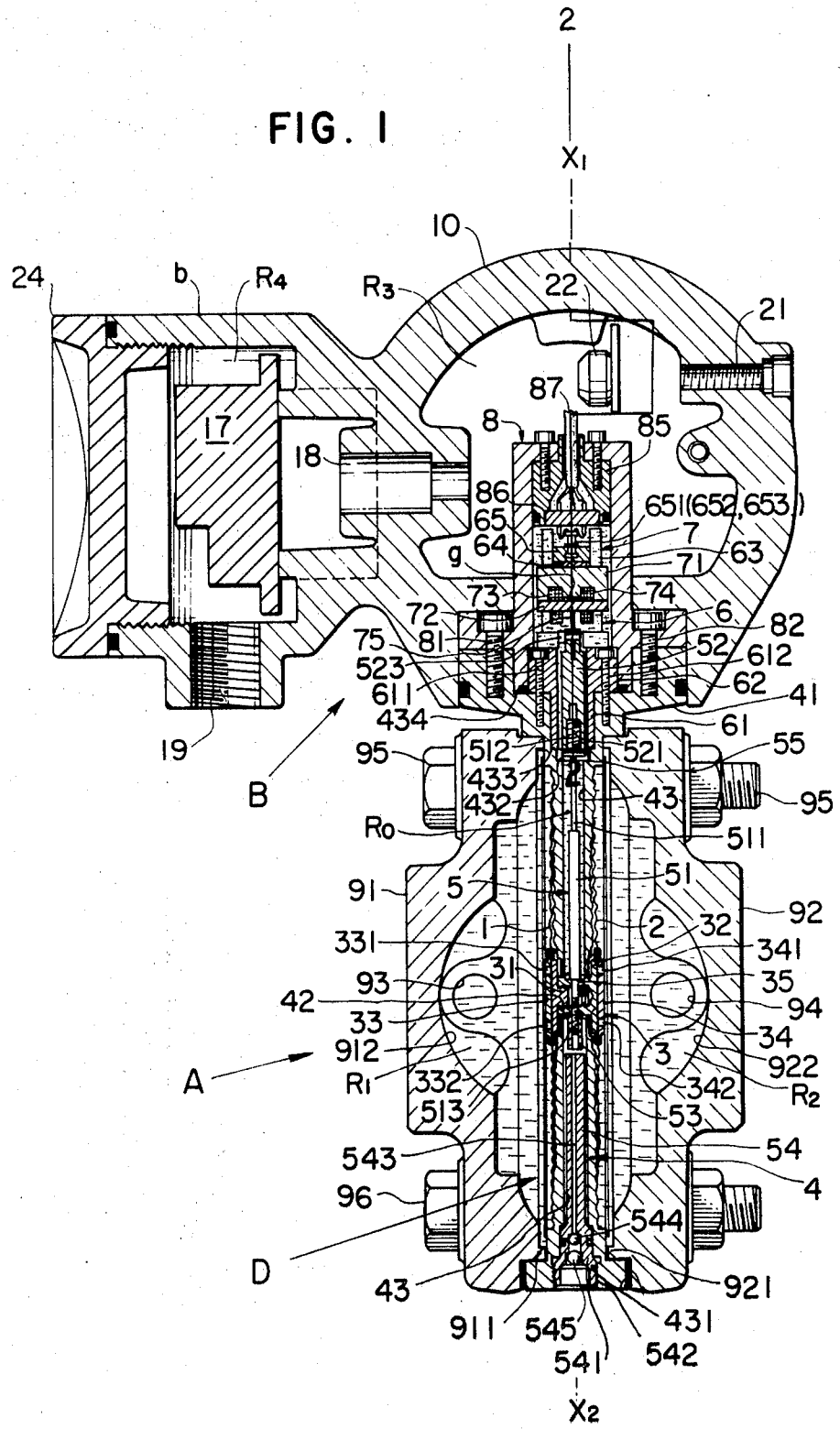
FIG. 1 is a cross-sectional view showing structural components and characteristic features of a preferred embodiment of the present invention, namely the symmetrically arranged, deflection-type differential-pressure transmitter.
Figure 2:
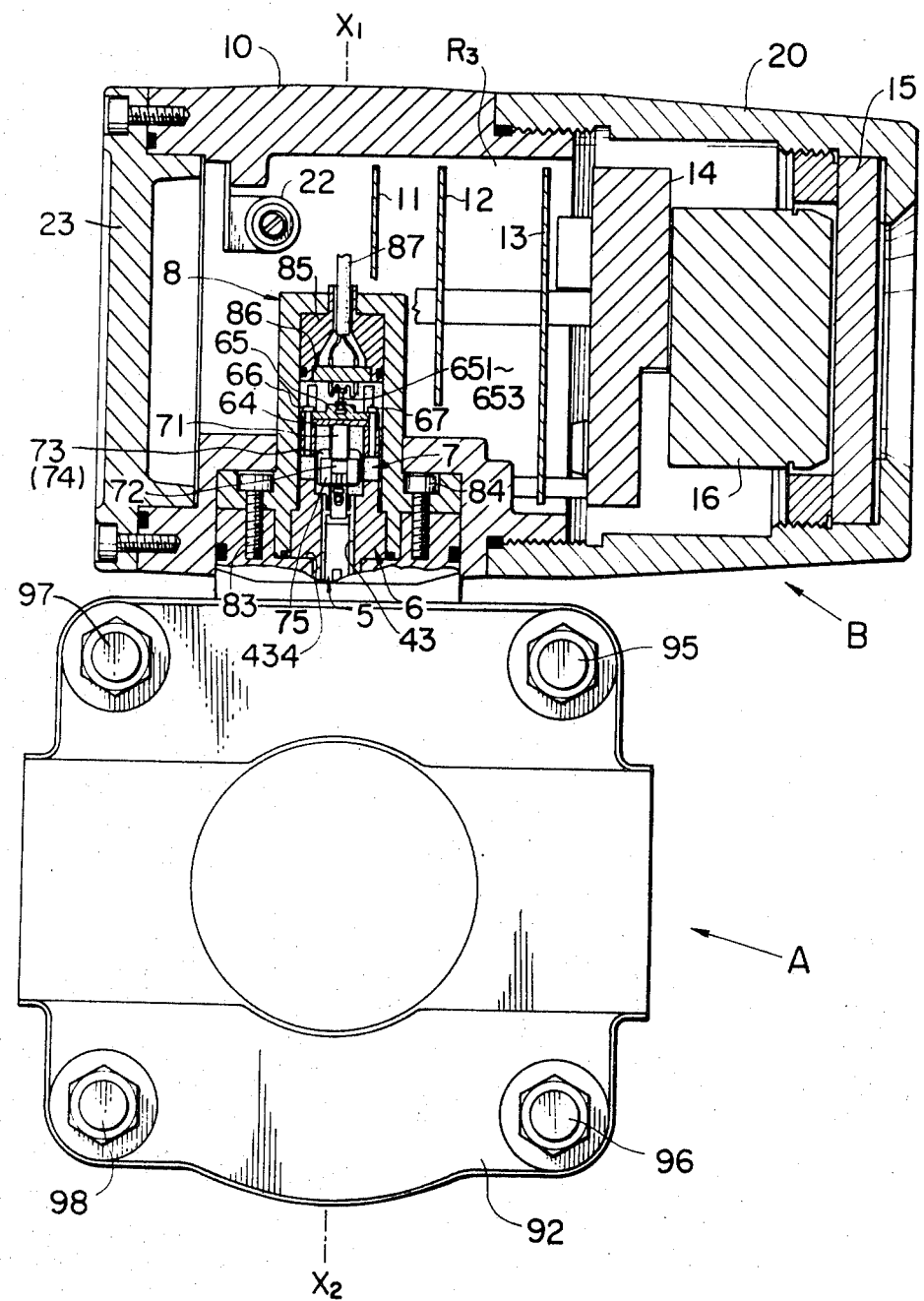
FIG. 2 is a partial cross-sectional view of this differential pressure transmitter taken through the discontinuous plane 2—2 of FIG. 1 looking toward the right, which illustrates the displacement-to-electric signal transducer.

FIGS. 1 and 2 show the structural components and characteristic features of a symmetrically arranged, differential-pressure transmitter constructed in accordance with the present invention, and adapted to measure ultra-low differential pressures ranging from 0 to 50 mm or 0 to 100 mm of water column. The symbol A represents a pressure responsive unit of square shape, and the symbol B represents a cylindrical outlet unit in the shape of a block $b$. The pressure responsive unit A includes two thin, resilient, concentrically corrugated disk diaphragms 1 and 2, a centrally located, spool-shaped connecting plug 3 which bridges between the centers of the diaphragms 1 and 2, and a back up plate 4.

Figure 3:
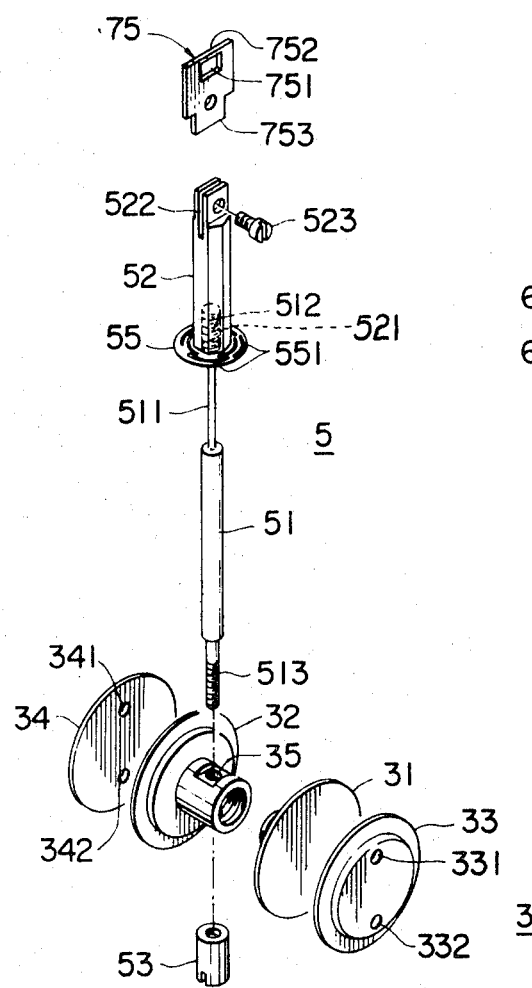
FIG. 3 is an exploded perspective view of the spring mechanism and its associated components used in the transmitter illustrated in FIGS. 1 and 2.

The connecting plug 3, shown in detail in FIG. 3, comprises a pair of connectors 31 and 32, T-shaped in cross-section, which are coupled together by an integral bolt and corresponding threaded bore, and a pair of external pads 33 and 34, fitted to the outer faces of the connectors 31 and 32. Each pad is provided with two clamp holes 331 and 332 and 341 and 342, respectively. The cylindrical portion of the connector 32 has a diametrically disposed, stepped-rod connecting hole 35.

The back-up plate 4 is formed from an annular casting and has a cup portion 41. A hole 42, of diameter sufficient to freely accept the cylindrical portion of the connector 32, passes axially through the center of the back-up plate 4. The opposite faces of the back-up plate 4 are provided with concentric corrugations which conform to and accept those formed on the disk diaphragms 1 and 2. A spring mechanism mounting hole 43 passes axially through the back-up plate cup portion 41 and diametrically through the back-up plate 4. This mounting hole 43 increases in diameter in a stepped fashion at its lower end opposite the back-up plate cup portion 41. The inner wall of the enlarged diameter portion of the mounting hole 43 has an internal thread 431. The mounting hole 43 perpendicularly intersects the axial hole 42 in the center of the back-up plate. The mounting hole 43 also is formed with increasing diameter, stepped portions 432, 433 and 434 inside the cup portion 41 of the back-up plate.

A spring mechanism in the form of a stepped rod 5 is mounted inside the mounting hole 43. As shown in detail in FIG. 3, this stepped rod includes a main spring 51 having a length 511 of reduced diameter. The rod 5 further has threaded ends 512 and 513 at its top and bottom respectively. An auxiliary spring 52, of larger diameter than the stepped rod 5, has an axially disposed, internal threaded bore 521 which accepts the threaded top 512 of the rod. The auxiliary spring 52 may with advantage be fabricated from stainless stell (SUS-32 or SUS 33) having a hexagonal cross-section. The main rod may with advantage be fabricated from beryllium copper (Be-Cu) with a coefficient of thermal expansion nearly equal to that of the stainless steel from which the auxiliary spring is fabricated. Both the main rod and the auxiliary spring have a predetermined elasticity.

The bottom threaded end 513 of the main rod is inserted into the connecting hole 35 disposed in the cylindrical portion of the plug 3 and is secured with a nut 53. A supporting spring 55, having a plurality of crecent-shaped, concentric cutouts 551 is clamped between the main rod 51 and the auxiliary spring 52 when both are joined by their corresponding threaded top 512 and threaded bore 521.

A filler tube 54, used to fill the diaphragm capsule with a suitable oil, is mounted in the bottom of the rod mounting hole 43. The base of the tube is provided with a flange 541 having an external thread 542 which mates with the internal thread 431 of the main rod mounting hole 43. The filler tube 54 is provided with an internal passageway 543 through which the oil is introduced to the interior of the diaphragm capsule. Two ball plugs 544 and 545 are fixed at the bottom of the filler tube 54 to ensure that the damping oil does not escape from the diaphragm capsule.

The two disk diaphragms 1 and 2, the spool-shaped connecting plug 3, and the back-up plate 4 are the main elements of the diaphragm capsule, generally indicated by the symbol D. This diaphragm capsule is assembled in the following manner. The connector 31 and the external pad 33 are respectively positioned on opposite sides of the diaphragm 1, as shown in detail in FIG. 1. The pad 33 is seam-welded about its periphery to the diaphragm 1 so that the connector 31 and the pad 33 integrally sandwich the diaphragm 1 therebetween. In the same manner, the connector 32 and the external pad 34 are fastened to the diaphragm 2. The diaphragm 2 is then continuously seam-welded at its periphery to the back-up plate 4. The stepped rod connecting hole 35 and the rod mounting hole 43, diametrically positioned in the back-up plate 4, are axially aligned prior to this welding operation. The diaphragmm 1 is then placed in contact with the opposite side of the back-up plate, and the bolt, integral with connector 31, is screwed into the corresponding threaded bore disposed in the cylindrical portion of the opposite connector 32. The operation coupling the two connectors may be accomplished by using a pair of special spanners, provided with studs which engage the clamp holes 331 and 332, and 341 and 342, respectively, disposed on each external pad. When the coupling operation is completed, the diaphragm 1 is continuously seam-welded at its periphery to the back-up plate 4. The stepped rod 5 is inserted into the mounting hole 43 from the cup portion 41. The rod's threaded base 513 is positioned in the rod connecting hole 35 in the cylindrical portion of the plug 3 and is secured with the nut 53. Finally, the filler rod 54 is inserted from the bottom into the mounting hole 43 and the threaded flange 541 is screwed into the threaded bore 542 disposed in the base of the back-up plate 4.

Figure 4:
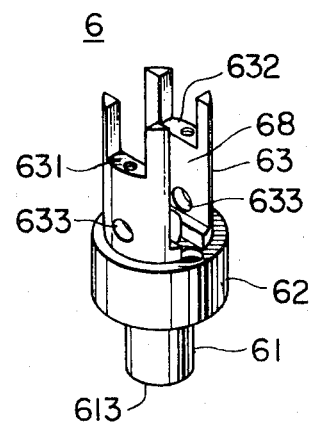
FIG. 4 is a perspective view of the universal head used in the transmitter illustrated in FIGS. 1 and 2.

The displacement-to-electrical signal transducer used in this embodiment of the present invention is mounted in a universal head 6, which in turn is positioned in the cup portion 41 of the back-up plate 4. The universal head 6, shown in detail in FIG. 4, is comprised of a cylindrical portion 62 having a leg 61 and a head portion 63 the top of which is divided into four extending fingers and the bottom of which is divided into two semi-circular blocks. The leg 61 is inserted into the stepped portions 433 and 434 of the mounting hole 43. In this manner, the support spring 55 is clamped between the base 613 of the leg 61 and the stepped portion 433 of the cup 41. This clamping arrangement is supplemented by two screws 611 and 612 which tightly couple the universal head 6 to the cup portion 41 of the back-up plate 4. Thus, the rigidly retained support spring 55 restricts the lateral displacement of the top of the stepped rod and the base of the auxiliary spring 52.

The displacement-to-electrical signal transducer, generally indicated at 7, is provided with a mounting plate 64 and a terminal block 65 which rigidly positions three terminals 651, 652, and 653. The mounting plate 64 spans the slot 68 cut in the universal head 6. Its ends rest on top of the facing surfaces 631 and 632 positioned between opposing pairs of the universal head fingers. The terminal plate 65 rests on top of the mounting plate 64 and both are secured to the universal head by two screws 66 and 67 as shown in FIG. 2. The displacement-to-electric signal transducer 7 is mounted on the mounting plate 64 and is held in the slot 68 formed in the universal head.

This signal transducer 7 is of the type generally known as differential inductor transducer. It includes an E-shaped ferrite core 71, and I-shaped core 72 secured to the E-shaped core 71, two coils 73 and 74 wound on the core 71, and a shorting-ring 75, which is shown in detail in FIG. 3. The shorting-ring 75 is formed in the shape of a square frame and is fabricated from a conductive material such as copper. The shorting-ring 75 encircles the I-shaped core 72 which is held within a window 751 in the shorting-ring. In this manner, a thin frame portion 752 is positioned in a flux gap g formed between and in the center of the E-shaped core 71 and the I-shaped core 72. The base 753 of the shorting-ring 75 is mounted in a slot 522 disposed in the top of the auxiliary spring 52. A screw 523, which is accessible through a hole 633 in the universal head 6, secures the shorting-ring 75 to the auxiliary spring 52. A cylindrical cover 8 protects the displacement-to-electric signal transducer 7 and is secured to the cup portion of the back-up plate with four screws 81, 82, 83, and 84. This cover, having a U-shaped cross section, completely covers the universal head 6. A lead wire 87 connected to the transducer 7 is sealed in a core cylinder 85. The lead wire 87 is attached to a terminal 86 mounted on top of the transducer. The space formed between the core cylinder 85, the terminal 86 and the lead wire 87 is filled with a plastic matrix, such as epoxy plastic, and is hermetically sealed. The diaphragm capsule D is completely sealed by a series of corrosion resistant rubber O-rings, generally indicated as blacked-out elliptical seals.

The entire diaphragm capsule D is positioned between a pair of housing blocks 91 and 92. An annular rib 911 is formed on the inner face of the housing block 91 and a corresponding annular rib 921 is formed on the opposing housing block 92. A partially spherical cavity is positioned in the center of each housing block, cavity 912 being disposed in housing block 91 and cavity 922 being disposed in housing block 92. The diaphragm capsule D is clamped between the housing blocks 91 and 92, which are securely fastened together by bolts 95, 96, 97, and 98. The spaces formed between the partially spherical cavities 912 and 922 and the diaphragms 1 and 2 form two pressure receiving chambers $R_1$ and $R_2$, respectively. Pressure guide bores 93 and 94 are drilled in the housing blocks 91 and 92. A device which generates a differential pressure, for example, an orifice mounted in a pipe line in an observed system, may be connected with the pressure receiving chambers by means of these guide bores 93 and 94.

The components of the diaphragm capsule D define an oil chamber $R_0$ which is filled with a viscous, silicone oil having a small coefficient of thermal expansion. The oil is introduced into the chamber $R_0$ as follows. Before the diaphragm capsule D is secured between the housing blocks, the oil chamber $R_0$ is evacuated through the passageway 543 in the filler tube 54 and is temporarily sealed with a suitable plug. The capsule D is then placed in a tank of silicone oil and the temporary plug is removed. Oil automatically fills the void created in the chamber $R_0$ under the influence of atmospheric pressure. When the chamber $R_0$ is completely filled with oil, ball plugs 544 and 545 are forced into the base of the filler tube 54 and are sealed by any suitable means such as welding, soldering, or the like. The silicone oil, which fills the chamber $R_0$, serves as an incompressible medium which transmits pressures exerted on the diaphragm from the pressure receiving chambers $R_1$ and $R_2$. Additionally, the silicone oil offers a dampening effect upon unwanted movement of the diaphragms in the diaphragm capsule.

As shown in detail in FIGS. 1 and 2, the outlet unit B has a main head 10 which is secured to the cup portion 41 of the back-up plate 4. Two chambers, $R_3$ and $R_4$, are formed within the main head 10. The cylinder cover 8, protecting the displacement to electric signal transducer 7, projects into the first chamber $R_3$ which is located above the pressure responsive unit A. The second chamber $R_4$ is formed within the block $b$ of the outlet unit B. Three printed circuit boards 11, 12, and 13, which provide electric circuits for suitably modifying and amplifying the output signal from the transducer, are mounted in the chamber $R_3$ and are shown in FIG. 2. An indicating meter 16, facing a window 15, and a terminal plate 14 are further mounted in the second chamber $R_3$. The scale on the indicating meter 16 may be graduated in terms of percentage of fluid flow and may then indicate a range of flow rate measured by the instrument. A screw cap 20 is attached to the main head 10 and covers the indicating meter 16, the window 15, and the terminal plate 14.

As shown in detail in FIG. 1, the second chamber $R_4$ houses a second terminal plate 17. A lead wire passage 18 is located between the chambers $R_3$ and $R_4$. A conduit 19 is positioned in the block $b$ and provides access for cables from an external power source into the differential pressure transmitter and for cables from an internal output circuit to an output metering device (not shown). End covers 23 and 24 are provided for the main head 10 and the block $b$ respectively, and are screwed into place. The covers may be removed in the event that internal inspection or maintenance of the instrument is required. The indicating meter 16 is provided with a zero adjusting variable resistor 22. Access to the resistor may be had with a screw driver through the access opening 21 positioned in main head 10. Suitable O-ring seals are indicated at various points by eliptical blacked-out portions and insure that the chambers $R_3$ and $R_4$ are hermetically sealed. All covers and screw connections which couple parts together about the chambers $R_3$ and $R_4$ conform to necessary safety standards. The constructions which house the entire differential pressure transmitter should be pressure resistant and explosion proof.

The differential pressure transmitter constructed in accordance with the present invention, operates in the following manner. The pressure guide bores 93 and 94 are connected to the entrance and exit of a suitable pressure differential producing means, such as an orifice, disposed in a pipe line carrying the observed fluid. Fluid pressure is then conducted to the pressure receiving chambers $R_1$ and $R_2$. For example, the first pressure receiving chamber $R_1$ is connected to the pipe line at a location immediately following the exit from the orifice device, thus being in communication with a source of low fluid pressure. The second pressure receiving chamber is connected to the pipe line immediately preceding the entrance to the orifice device, thus being connected to a source of high fluid pressure. The pressure differential which exists between the first and second pressure receiving chambers produces a net force on the diaphragms 1 and 2. This force depends upon the effective diaphragm area $A_d$ and the presence differential P. As previously noted, the diaphragms 1 and 2 have identical areas. The force developed in the first pressure receiving chamber $R_1$ and directed against the diaphragm 1 opposes the force developed in the second pressure receiving chamber $R_2$ against the diaphragm 2. If no fluid passes through the pipe line and consequently through the orifice device, no pressure differential results. That is, the pressures in the pressure receiving chambers $R_1$ and $R_2$ are equal to each other and no net force acts upon the diaphragm capsule D. Therefore, no diaphragm displacement occurs. However, if fluid does flow through the pipe line and hence the orifice device, a pressure differential $\Delta P$ between the pressure receiving chambers results. Then, a net force F acting upon the diaphragm capsule D is developed. This force F is expressed as follows:

$$F = Kd/Ks + Kd\ A_2 x\ P$$

1 where Kd = the spring constant of the diaphragms 1 and 2 (mm/kg) Ks = the spring constant of the spring mechanism 5 (mm/kg)

If the high pressure source communicates with pressure receiving chamber $R_2$ and the low pressure source communicates with the pressure receiving chamber $R_1$, the differential pressure $\Delta P$ acts upon the diaphragms 1 and 2 to displace the connecting plug 3 leftward. As a result, the spring mechanism 5, supported by the support spring 55 and linked at its lower end to the connecting plug 3, is deflected as shown in detail in FIGS. 6 and 7. When the force F is equal to the reaction force of the spring mechanism 5 and the diaphragms 1 and 2, the system assumes an equilibrium position and deflection stops.

The function of the spring mechanism 5 and the diaphragms 1 and 2 is further described with reference to FIGS. 5, 6, and 7. When no fluid flows through the pipe line and hence the orifice device, no pressure differential between the pressure receiving chambers $R_1$ and $R_2$ occurs, or $\Delta P = 0$. When the differential pressure is zero, the spring mechanism 5 rests on the reference line $X_1 - X_2$, as shown in FIG. 5. However, when fluid passes through the pipe line and hence the orifice device, a pressure differential $\Delta P$ between the pressure receiving chambers $R_1$ and $R_2$ results, and thus creates a net force F which acts upon the diaphragms 1 and 2. The net force F causes the connecting plug to be displaced leftward. Simultaneously, the reduced diameter portion 511 of the spring mechanism 5 is bent to deflect the auxiliary spring 52 through an angle $\theta$, as shown in FIG. 6. A shown in detail in FIG. 7, the displacement $\delta_1$ of the connecting plug 3 at its center and the displacement $\delta_2$ of the shorting-ring 75 are given as follows:

$$\delta_1 = Fl_2^3/3EI_2 \ x^3 (Y - 1) + 1 \quad 2$$

$$\delta_2 = (l_3 - l_2) \ Fl_2^2/2EI_2 \ x^2 (y - 1) + 1 \quad 3$$

where $I_2$ = the second moment of area of the auxiliary spring 52

E = the Young's modulus of the main spring 51

$l_1$ = the length of the main rod portion of reduced diameter 511

$l_2$ = the distance between the top surface of the connecting plug 3 and the support spring 55

$l_3$ = the distance between the top surface of the connecting plug 3 and the top of the shorting-ring 75

$d_1$ = the reduced diameter of the main rod 51

$d_2$ = the enlarged diameter of the main rod 51

$x = l_1/l_2$ $y = (d_2/d_1)^4$

Prior to operation, the displacement to electric signal transducer 7 is energized, thereby exciting the two coils 73 and 74. The inductances of the two coils 73 and 74 change when the displacement of the shorting-ring 75 changes under the influence of a net force F moving the auxiliary spring mechanism through an angle $\theta$. When the shorting-ring is displaced rightward, as shown in FIGS. 6 and 7, the inductance of the coil 73 on the left increase. The following relationship then exists between the inductances $L_1$ and $L_2$ and the excited currents $i_1$ and $i_2$ of the coils 73 and 74 respectively:

$$i_1 - i_2 \ 2 = (i_1 + i_2) \ L_2 - L_1/L_1 + L_2 \quad 4$$

Given this relationship, it is possible to make the current difference $i_1 - i_2$ correspond to the change in inductances of the coils 73 and 74 by constraining the sum of the currents $i_1$ and $i_2$ to be a constant value. The relative inductances $L_1$ and $L_2$ of the coils 73 and 74 respectively, indicate the relative magnitude of the displacement of the shorting-ring 75. Therefore, the current difference $i_1 - i_2$ also indicates the relative magnitude of displacement of the shorting-ring 75.

The currents $i_1$ and $i_2$, passing through the coils 73 and 74 respectively, are conducted from the displacement-to-electric signal transducer through the lead wire 87 and are supplied to the outlet unit B, as shown in detail in FIGS. 1 and 2. The current difference $i_1 - i_2$ is characterized and amplified by the electronic circuits disposed on the printed circuit boards 11, 12 and 13 mounted within the outlet unit B and are delivered as an output signal to the first terminal plate 14 and ultimately to the indicating meter 16. The meter 16 may then be calibrated to indicate fluid flow rates through the orifice device. The output signal may be transmitted to an external instrument by means of a cable having access to the outlet unit B through the access opening 19.

The diaphragm capsule is symmetrically constructed with respect to the reference line $X_1 - X_2$. Therefore, error caused by thermal expansion of the capsule components is minimized. For example, if the spring mechanism 5 expands due to an increase in temperature, the main rod 51 will elongate. However, this expansion does not cause any lateral deflection of the shorting ring 75 which would be measured by the displacement-to-electrical signal transducer 7. Similarly, if the connecting plug 3 expanded under the influence of increased temperature, expansion would occur equally on both sides of the axis of symmetry and no net effect causing a displacement of the shorting ring 7y5 would result.

The specifications of interest regarding the differential pressure transmitter described with reference to the first embodiment of the present invention are listed as follows:

| | | |
|---|---|---|
| 1. | Input Differential Pressure Range for the Basic Transmitter Design | 0 to 100 mm $H_2O$ |
| 2. | Scale Range for Any Particular Differential Pressure Transmitter | 10 x |
| 3. | Accuracy | To within less than 0.1% of Scale span |
| 4. | Temperature Error | ±1% in case of minimum range with reference to the zero point in the range between −20 to +80°C, or ±2% with reference to scale span in the range between −20 to +80°C |
| 5. | Static Pressure Error | less than 0.2% in case of minimum range with reference to the zero point at 2 kg/cm²G |
| 6. | Natural Frequency | 190 Hz |

Figure 8:
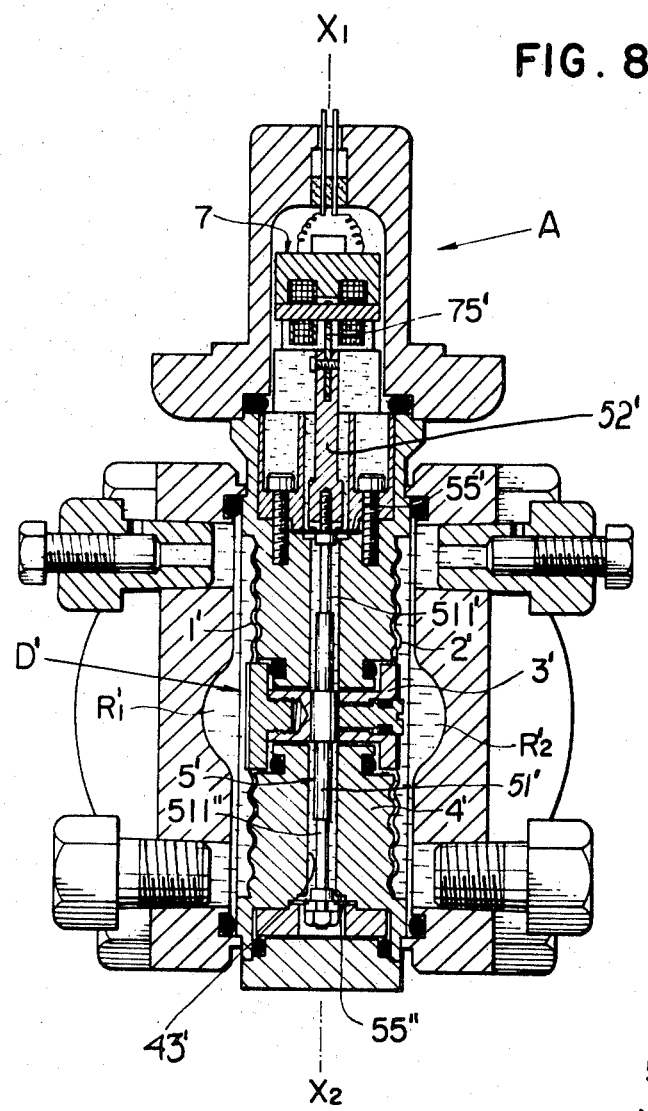
FIG. 8 is a cross-sectional view showing structural components and characteristic features of the pressure-responsive unit incorporated in another preferred embodiment of the present invention.
Figure 9:
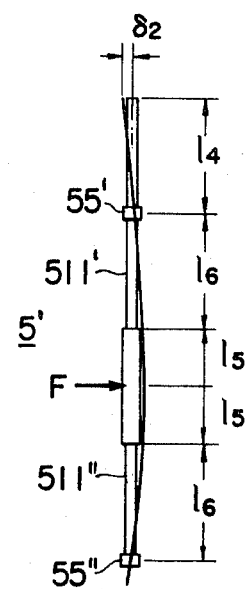
FIG. 9 is a schematic diagram of the embodiment of the invention shown in FIG. 8 illustrating the pressure-responsive unit when it is displaced from its rest position.

A second preferred embodiment of the present invention is illustrated in detail in FIGS. 8 and 9. For purposes of illustration, and since the displacement-to-electric signal transducer employed in this second embodiment is the same as that employed in the first embodiment, only the pressure responsive unit is shown. The diaphragms 1' and 2', employed in this second preferred embodiment of the present invention, are fabricated from thicker material, are smaller in diameter, and have more deeply and widely pronounced corrugations than do the diaphragms 1 and 2 illustrated in FIGS. 1 and 2 with reference to the first preferred embodiment. This second differential pressure transmitter is capable of measuring medium and high pressure differentials. Generally, medium pressure differentials are considered to range from 500 to 5,000 millimeters of water column or from 0.005 to 0.5 kg/cm², and high pressure differentials are considered to range from 3,000 to 30,000 millimeters of water column or from 0.3 to 3 kg/cm². The spring mechanism 5' illustrated in FIG. 8, is similar in shape to that illustrated in FIGS. 1 and 2. However, the spring mechanism 5' is mounted and supported in a manner different from that of the spring mechanism 5.

As illustrated in FIG. 8, the spring mechanism 5' extends both upward and downward from the connecting plug 3'. The main spring rod 51' is formed with two portions having reduced diameters 511' and 511'' positioned symmetrically with respect to the axis of the connecting plug 3'. A support spring is bolted to both the top and bottom of the main rod 51'. The springs 55' and 55'' are suitably clamped at the top and bottom of the spring mechanism mounting hole 43' in the back-up plate 4'. The filler tube 54 illustrated in FIGS. 1 and 2, is necessarily omitted in this second embodiment of the present invention. An auxiliary spring 52' is mounted atop the main spring rod 51' and supports a shorting-ring 75' in operating relation with the displacement-to-electric signal transducer 7.

In this second embodiment of the invention, when the connecting plug 3 is displaced, for example, rightward, under the influence of a pressure differential ΔP between the pressure receiving chambers $R_1'$ and $R_2'$, the spring mechanism 5' is bent like a bow to displace the shorting-ring 75' leftward. This displacement is illustrated in detail in FIG. 9. The displacement $\delta_2$ of the shorting-ring is given as follows:

$$\delta_2 = Fl_4/2E \; l_5^2/2I + 1/I_2 \; (l_5 \cdot l_6 + l_6^2/2) \qquad 5$$

where:
- E = the Young's modulus of the main spring 51'
- I = the second moment of area of the main spring 51'
- $I_2$ = the second moment of area of the auxiliary spring 52'
- $l_4$ = the distance from the support spring 55' to the top of the shorting-ring 75'
- $l_5$ = one half of the length of the main rod 51' portion having an enlarged diameter
- $l_6$ = the length of the main rod portions 511' and 511'' having reduced diameter.

In the embodiment of the present invention illustrated in FIGS. 8 and 9, the spring mechanism 5' is supported at two points by the support springs 55' and 55''. The spring mechanism 5' is further supported by the connecting plug 3'. Therefore, the spring mechanism 5' is not influenced by internal vibration or by the attitude in which the differential pressure transmitter is installed.

The diaphragm capsule D' illustrated in FIG. 8, is constructed with its components symmetrically arranged about the reference line $X_1 - X_2$. Therefore, as was the case with the first embodiment of the present invention, the diaphragm capsule is not measurably affected by thermal expansion of its components. Nor is the capsule measurably affected by the attitude in which the differential pressure transmitter containing it is installed. For example, if the spring mechanism 5' expands under the influence of an increased ambient temperature, the main spring rod would expand linearly along the reference line $X_1 - X_2$. This expansion would not affect a displacement of the shorting-ring 75' to cause a measurable change in output from the displacement-to-electric signal transducer since linear expansion along the reference line would not displace the shorting-ring.

Although specific embodiments of the present invention are disclosed above in detail, it is to be understood that this is for the purpose of illustrating the invention, and should not be construed as necessarily limiting the scope of the invention, since many changes can be made to the disclosed structure by those skilled in the art to suit particular applications.

We claim:

1. A differential pressure transmitter for controlling fluid flow rate and other parameters which can be related to a pressure differential in industrial systems and processes, comprising:

housing means;

pressure responsive means including two diaphragm members mounted in generally parallel, spaced relation in said housing means and being symmetrical when in their rest position about an axis of symmetry extending perpendicularly to the diaphragm axis; connecting means for linking said diaphragm members together at their centers; and a spring rod mechanism comprising a rod element for transmitting movement of said connecting means out through the pressure responsive means to permit sensing thereof, said rod element being secured at a first portion to said connecting means; support means pivotally mounting at least one end of said rod element with respect to said housing means; said rod element having at least one second portion thereof constructed and arranged to provide for bending thereof about the longitudinal axis of said rod element as said connecting means moves with said diaphragm members; an extension member secured to said one end of said rod element to effect angular movement in response to bending movement of said second rod element portion so as to transmit such movement beyond said pressure responsive means;

a high pressure receiving chamber located in said housing means to communicate with one of said diaphragm members;

a low pressure receiving chamber located in said housing means to communicate with the opposite diaphragm member;

means for detecting displacement and converting displacement into an output response mounted above said pressure responsive means and including means responsive to the angular movement of the outer end of said extension member whereby a pressure differential created between said high and low pressure receiving chamber produces a resulting force which causes both diaphragm members to deform, transversely displacing said connecting means and axially bending said second rod element portion to angularly displace said rod extension member, the movement of the rod extention member being detected and converted to an output response by said detecting and converting means.

2. The differential pressure transmitter as claimed in claim 1 wherein said diaphragm members are in the form of first and second diaphragms and wherein said pressure responsive means further comprises:

a backup plate having first and second generally parallel, spaced faces, diametrically disposed mounting hole which does not pass through either said first or said second backup plate face, the axis of the mounting hole being coincident with the axis of symmetry, and an axially disposed transverse hole extending between said first and second backup plate faces and intersecting the mounting hole, said first diaphragm being continuously supported at its periphery by and in sealing engagement with said first backup plate face, and said second diaphragm being continuously supported at its periphery by and in sealing engagement with said second backup plate face, said connecting means linking said diaphragms being freely disposed in the transverse hole and said spring rod mechanism being freely disposed in said mounting hole.

3. The differntial pressure transmitter as claimed in claim 2 wherein said diaphragms have concentric corrugations, said backup plate has similar concentric corrugations which conform to and accept the respective, adjacent diaphragm corrugations and said backup plate and said diaphragms define an oil chamber which is filled with oil for dampening unrestrained deformation of said diaphragms.

4. The differential pressure transmitter as claimed in claim 1 wherein said spring rod element is cylindrical, said first portion has relatively large diameter and is coupled to said connecting means, said second portion being of relatively small diameter to provide for said bending, said extension member comprising an auxiliary rod mounted at the top of the reduced diameter portion of said spring rod element, and said support means comprises a flexible diaphragm clamped at its center between said rod element and said extension member and fixed at its periphery in said housing means, said connecting means and said support means supporting said rod at two points for eliminating output displacement error of the differential pressure transmitter due to changes in the attitude of transmitter installation.

5. The differential pressure transmitter as claimed in claim 1 wherein said spring rod element is cylindrical and has a middle first portion of relatively large diameter coupled to said connecting means, and two second portions of relatively small diameter extending in opposite directions axially away from said middle first portion to provide said bending and being equidistant from said enlarged diameter middle portion; wherein said extension member comprises an auxiliary rod mounted at the top of one of said second portions of said spring rod element, and wherein said support means comprises first and second flexible diaphragms, said first flexible diaphragm being clamped at its center between said one of said second spring rod portions and said extension member and said second flexible diaphragm being fixed to the other of said second spring rod portions, said first and second support means further being fixed in said housing to support said rod at three points.

6. The differential pressure transmitter as claimed in claim 1 wherein said means for detecting displacement and converting displacement to an output response is a displacement to electric signal transducer mounted relative to the axis of symmetry for detecting displacement only in a lateral direction from the axis of symmetry whereby error due to thermal expansion of the components of said pressure responsive means is minimized.

7. The differential pressure transmitter as claimed in claim 6 wherein said displacement to electric signal transducer is provided with an outlet unit having output elements for amplifying the output response and computing the pressure differential existing between said high and low pressure receiving chambers in terms of the output response.

8. A differential pressure transmitter for controlling fluid flow rate, and other parameters which can be related to a pressure differential, in industrial systems and processes, comprising:

a twin capsule having a pair of corrugated diaphragms and a backup plate for supporting the two diaphragms at their peripheries, said backup plate having corrugations which conform to and accept the respective, adjacent diaphragm corrugations, said diaphragms and said backup plate forming a hermetically sealed oil chamber therebetween; connecting means linking said diaphragms together at their centers; a spring mechanism in the form of a stepped rod mounted between and linked to the two diaphragms at their center portions through said connecting means disposed in the oil chamber; said stepped rod having a first portion of enlarged diameter, at least one second axially bendable portion of reduced diameter, support means for pivotably fixing each of said second portions to said backup plate and a third auxiliary extension portion extending out of said diaphragm capsule beyond said support means; and a displacement of electric signal transducer mounted in operative relation with said stepped rod extension portion, disposed in the oil chamber, for transducing the displacement of said extension portion into an electric signal.

9. A differential pressure transmitter for controlling fluid flow rate, and other parameters which can be related to a pressure differential, in industrial systems and processes and of the type having a pressure responsive unit, said unit cmprising:

a twin diaphragm capsule having a pair of corrugated diaphragms and a backup plate for supporting the two diaphragms at their peripheries said backup plate having corrugations which conform to and accept the respective, adjacent diaphragm corrugations, said diaphragms and said backup plate forming a hermetically sealed oil chamber therebetween; connecting means linking said diaphragms together at their centers; a spring mechanism in the form of a stepped rod mounted between and linked to the two diaphragms at their center portions through said connecting means disposed in the oil chamber; said stepped rod having a first portion of enlarged diameter, at least one second axially bendable portion of reduced diameter, support means for pivotably fixing each of said second portions to said backup plate and a third auxiliary extension portion extending out of said diaphragm capsule beyond said support means; a shorting-ring mounted at the top of said spring mechanism on said extension portion; and a differential inductor displacement to electric signal transducer disposed in the oil chamber and mounted to detect the displacement output of said shorting-ring, whereby the inductance of said transducer changes when the displacement of said shorting-ring changes; the pressure responsive unit further comprising an outlet unit capable of supplying an external instrument with an electric signal coresponding to the differential pressure exerted on the two diaphragms.

10. The differential pressure transmitter as claimed in claim 9 wherein said first stepped rod portion is linked to said two diaphragms through said connecting means, and wherein said stepped rod has one second portion pivotably fixed by said support means to said backup plate.

11. The differential pressure transmitter as claimed in claim 9 wherein said stepped rod has a middle first portion linked to said two diaphragms through said connecting means, and has two second portions with reduced diameters, each of said second portions being pivotably fixed by said support means to said backup plate, said middle first portion being equally distant from the ends of said second portions.

12. A differential pressure transmitter for controlling fluid flow rate, and other parameters which can be related to a pressure differential, in industrial systems and processes, having a pressure responsive unit said pressure responsive unit comprising:
a twin diaphragm capsule having a pair of corrugated diaphragms, and a backup plate for supporting the two diaphragms at their peripheries, said backup plate having corrugations which conform to and accept the respective, adjacent diaphragm corrugations, said diaphragms and said backup plate forming a hermetically sealed oil chamber therebetween; a spring mechanism, disposed in the oil chamber, comprising a main spring, an auxiliary spring, and a thin support spring, the main spring being in the form of a stepped rod and having a lower end linked to the two diaphragms through a connecting means, said main spring also having an upper end, said auxiliary spring being joined to said upper end of said main spring and having a top equipped with a shorting-ring, the spring mechanism being supported by said backup plate by way of said thin support spring held between said main spring and said auxiliary spring at their joint; and a differential transformer displacement to electric signal transducer, disposed in the oil chamber, whose inductance changes when the displacement of said shorting-ring changes; the pressure responsive unit further comprising an outlet unit, disposed above said twin diaphragm capsule, having output elements for computing and amplifying the output signal from the displacement to electric signal transducer and thus supplying an external instrument with an electric signal corresponding to the differential pressure exerted on the two diaphragms.

13. A differential pressure transmitter for controlling fluid flow rate, and other parameters which can be related to a pressure diffenential, in industrial systems and processes, having a pressure responsive unit comprising:
a twin diaphragm capsule having a pair of corrugated diaphragms, and a backup plate for supporting the two diaphragms at their peripheries, said backup plate having corrugations which conform to and accept the respective, adjacent diaphragm corrugations, said diaphragms and said backup plate forming a hermetically sealed oil chamber therebetween; a spring mechanism, disposed in the oil chamber, comprising a main spring, an auxiliary spring, and a thin supporting spring, the main spring being in the form of a stepped rod and having a lower end linked to the two diaphragms through a connecting means, said main spring also having an upper end, said auxiliary spring being joined to said upper end of said main spring, the spring mechanism being supported by said backup plate by way of said thin support spring held between said main spring and said auxiliary spring at their joint; means for detecting displacement of said auxiliary spring and converting this displacement into an output signal disposed in the oil chamber; the pressure responsive unit further comprising an outlet unit, disposed above said twin diaphragm capsule, having output elements for computing and amplifying the output signal from the detecting and converting means.

14. A differential pressure transmitter for controlling fluid flow rate and other parameters which can be related to a pressure differential in industrial systems and processes, comprising:
housing means;
pressure responsive means including two diaphragm members mounted in generally parallel, spaced relation in said housing means and being symmetrical when in their rest position about an axis of symmetry extending perpendicularly to the diaphragm axis; connecting means for linking said diaphragm members together at their centers; and a spring rod mechanism disposed on the axis of symmetry when in its rest position and coupled to said connecting means, said spring rod mechanism comprising a main spring rod having a first portion of enlarged diameter coupled to said connecting means and second portion of reduced diameter, and auxiliary spring rod mounted at the top of the reduced diameter portion of said main spring rod, and a support spring, clamped at its center between said main spring and said auxiliary spring rods and fixed at its periphery in said housing means, said connected means and said support spring supporting said main and auxiliary spring rods at two points for eliminating output displacement error of the differential pressure transmitter due to the attitude of transmitter installation;
a high pressure receiving chamber located in said housing means to communicate with one of said diaphragm members;
a low pressure receiving chamber located in said housing means to communicate with the opposite diaphragm member;
means for detecting displacement and converting displacement into an output response mounted above said pressure responsive means whereby a pressure differential created between said high and low pressure receiving chambers produces a resulting force which causes both diaphragm members to deform, transversely displacing said connecting means and displacing said spring rod mechanism from the axis of symmetry, the spring rod mechanism displacement being detected and converted to an output response by said detecting and converting means.

15. A differential pressure transmitter for controlling fluid flow rate and other parameters which can be related to a pressure differential in industrial systems and processes, comprising:

housing means;

pressure responsive means including two diaphragm members mounted in generally parallel, spaced relation in said housing means and being symmetrical when in their rest position about an axis of symmetry extending perpendicularly to the diaphragm axis; connecting means for linking said diaphragm members together at their centers; and a spring rod mechanism disposed on the axis of symmetry when its rest position and coupled to said connecting means; said spring mechanism comprising a main spring rod having a middle portion of enlarged diameter coupled to said connecting means, a first extension portion of reduced diameter and a second, opposite extension portion of similar reduced diameter, said first and second extension portions being equidistant from said enlarged diameter middle portion; an auxiliary spring rod mounted at the top of first extension of said main spring rod; and first and second support springs, said first support spring being clamped at its center between said first main spring rod extension portion and said auxiliary spring rod and said second support spring being fixed to said second main spring rod extension, said first and second support springs further being fixed in said housing to support said main and auxiliary spring rods at three points;

a high pressure receiving chamber located in said housing means to communicate with one of said diaphragm members;

a low pressure receiving chamber located in said housing means to communicate with the opposite diaphragm member;

means for detecting displacement and converting displacement into an output response mounted above said pressure responsive means whereby a pressure differential created between said high and low pressure receiving chambers produces a resulting force which causes both diaphragm members to deform, transversely displacing said connecting means and displacing said spring rod mechanism from the axis of symmetry, the spring rod mechanism displacement being detected and converted to an output response by said detecting and converting means.

* * * * *

UNITED STATES PATENT OFFICE
CERTIFICATE OF CORRECTION

Patent No. 3,869,920  Dated March 11, 1975

Inventor(s) Rin-Ichi Miyauchi; Bunjiro Saito; Kyoichi Ikeda

It is certified that error appears in the above-identified patent and that said Letters Patent are hereby corrected as shown below:

Column 8, line 51 reads:  $F = Kd/Ks + Kd\ A_2 x\ P$   Eq. 1

Should read:  $F = Kd/Ks + Kd\ A_d x\ P$   Eq. 1

Column 9, line 19    Change "A" to --As--

Column 9, line 22 reads:  $\alpha_1 = F\ell_2^3/3EI_2\ x^3(Y-1)+1$   Eq. 2

Should read:  $\alpha_1 = F\ell_2^3/3EI_2\ \{x^3(Y-1)+1\}$   Eq. 2

Column 9, line 26 reads:

$$\alpha_2 = (\ell_3 - \ell_2)\ F\ell_2^2/2EI_2\ x^2(y-1)+1 \quad \text{Eq. 3}$$

Should read: $\alpha_2 = (\ell_3 - \ell_2)\ F\ell_2^2/2EI_2\{x^2(y-1)+1\}$   Eq. 3

Column 9, line 56 reads:
  $i_1-i_2\ 2 = (i_1 + i_2)\ L_2 - L_1/L_1 + L_2$   Eq. 4

Should read: $i_1-i_2\ [2] = (i_1 + i_2)\ L_2 - L_1/L_1 + L_2$   Eq. 4

Column 10, line 28    Change "7y5" to --75--

Column 11, line 31 reads:

I = the second moment of area of the main spring 51'

Should read:

I = the second moment of area of the main spring 51"

Signed and sealed this 27th day of May 1975.

(SEAL)
Attest:

RUTH C. MASON
Attesting Officer

C. MARSHALL DANN
Commissioner of Patents
and Trademarks